(12) United States Patent
Ito et al.

(10) Patent No.: US 7,533,927 B2
(45) Date of Patent: May 19, 2009

(54) SHOCK ABSORBING STRUCTURE FOR VEHICLE, AND ATTACHMENT STRUCTURE FOR THE SAME

(75) Inventors: Kaoru Ito, Toyota (JP); Hiroyasu Miyamoto, Nishikamo-Gun (JP); Sohta Norikane, Okazaki (JP)

(73) Assignees: Kojima Press Industry Co., Ltd., Toyota-Shi (JP); Toyota Jidosha Kabushiki Kaisha, Toyota-Shi (JP)

( * ) Notice: Subject to any disclaimer, the term of this patent is extended or adjusted under 35 U.S.C. 154(b) by 31 days.

(21) Appl. No.: 11/669,270

(22) Filed: Jan. 31, 2007

(65) Prior Publication Data

US 2007/0200375 A1 Aug. 30, 2007

(30) Foreign Application Priority Data

Feb. 24, 2006 (JP) .............................. 2006-048798

(51) Int. Cl.
*B60R 19/18* (2006.01)

(52) U.S. Cl. ................................. 296/187.03; 293/120

(58) Field of Classification Search ......... 293/120–122; 296/187.04, 187.05, 187.03; 280/748
See application file for complete search history.

(56) References Cited

U.S. PATENT DOCUMENTS 6,726,262 B2 * 4/2004 Marijnissen et al. ........ 293/121

6,866,313 B2 * 3/2005 Mooijman et al. .......... 293/120
6,923,494 B2   8/2005 Shuler et al.
6,938,936 B2 * 9/2005 Mooijman et al. .......... 293/120
2006/0043743 A1 * 3/2006 Shuler et al. ................ 293/120

FOREIGN PATENT DOCUMENTS

| JP | 2003-285704 A1 | 10/2003 |
| JP | 2004-168077 A1 | 6/2004 |
| JP | 2004-224106 A1 | 8/2004 |
| JP | 2004-322876 A1 | 11/2004 |
| JP | 2005-104164 A1 | 4/2005 |
| JP | 2005-510393 A1 | 4/2005 |
| JP | 2005-536392 | 12/2005 |
| WO | WO 03/037688 A1 | 5/2003 |

\* cited by examiner

*Primary Examiner*—Dennis H Pedder
(74) *Attorney, Agent, or Firm*—Burr & Brown (57) ABSTRACT

It is an object of the present invention to provide a shock absorbing structure for a vehicle that enables a simple and appropriate tuning of a load displacement characteristic, so that a desired amount of collision energy can be absorbed. In the present invention, each of two side walls which is integrally provided with top wall, to which a shock is applied, has a rectangular wave shape corrugated at a plurality of corrugated sections positioned to be opposed to each other in a direction perpendicular to a direction in which the shock is applied. In addition, outer flanges are integrally formed on an end section of each of the side walls, and a slit extending in the direction in which the shock is applied is formed on each of the corrugated sections.

12 Claims, 9 Drawing Sheets

SHOCK ABSORBING STRUCTURE FOR VEHICLE, AND ATTACHMENT STRUCTURE FOR THE SAME

The present application is based on Japanese Patent Application No. 2006-048798 filed on Feb. 24, 2006, the contents of which are incorporated herein by reference.

BACKGROUND OF THE INVENTION (1) Field of the Invention

The present invention relates to a shock absorbing structure for a vehicle and an attachment structure for such a shock absorbing structure, and particularly relates to a shock absorbing structure for a vehicle that is intended to protect a pedestrian and a vehicle occupant by moderating a shock applied to the pedestrian or the vehicle occupant at the time of a contact with the pedestrian or objects other than the pedestrian, or at the time of a car crash, and to a structure for advantageously attaching such shock absorbing structure to the vehicle.

(2) Discussion of Related Art

Conventionally, in many vehicles, shock absorbing structures are provided on a vehicle mounted component, such as a pillar garnish, a roof side rail or an instrument panel which is highly possible to come into contact with the vehicle occupant's head or a leg at the time of the car crash, at a side of the vehicle mounted component opposite to the vehicle interior compartment (rear side). In this way, when the vehicle occupant comes into contact with the internal components at the time of the car crash etc., the shock to be applied to the vehicle occupant is moderated, hopefully protecting the occupant. Also, in recent years shock absorbing structures have been fitted not only to interior components but also to inner sides of external components such as a bumper etc., that have a high likelihood of coming into contact with a pedestrian when the pedestrian's leg, for example, contact with these external components while the vehicle is traveling, a collision energy generated accompanying the contact is absorbed by deformation of the shock absorbing structure, and it is also possible to take pedestrian protection measures that are intended to reduce a risk of an injury to the pedestrian's leg.

As is well known, there are many different types of the shock absorbing structure having various configurations, for example, as a shock absorbing structure fitted at an inner side of a bumper, there are (a) a structure formed from bent plates of a metal such as an aluminum or a steel presenting a cross sectional shape that resembles a U-shape, so that the shock absorbing structure is subjected to a buckling deformation when a shock is applied (for example, see JP-A-2003-285704 and JP-A-2004-322876); and (b) a structure formed of a resin foam body presenting a hollow shape (see, for example, to JP-A-2004-168077 and JP-A-2004-224106). Of these, with the shock absorbing structure (a), with respect to an initial stage of an application of the shock, a load applied to the structure suddenly increases with a small amount of displacement, and after that regardless of any increase in the amount of displacement the load value changes substantially constantly, and an ideal load displacement characteristic tracing a rectangular pulse is ensured. Also, with the shock absorbing structure of (b), compared with the shock absorbing structure of a conventional solid resin foam body, there are improved not only far better lightweight properties are obtained, but the shock absorbing characteristics at the initial stage of the application of the shock.

However, with the shock absorbing structure formed from the bent metal plate, not only the weight is significant, which has a detrimental effect on a fuel consumption, but also it is difficult to adapt overall a shape of the shock absorbing structure to the shape of an installation space since a moldability is poor. Also, with the shock absorbing structure formed with the hollow resin foam body, it is not possible to obtain the load displacement characteristic that displays a rectangular wave shape, and also, since a crack is easily occurred at the time of the application of the shock, it is not a simple matter to stably secure the shock absorbing characteristics that do not vary for each of the shock absorbing structures. Specifically, the shock absorbing structures of (a) and (b) described above have some inherent problems that need to be improved upon.

In the light of the situations as described above, there has been proposed (c) a shock absorbing structure for a vehicle consisting of a resin main body having a top wall to which an shock is applied, and side walls, for absorbing shock by being buckled and deformed by the application of the shock, provided integrally with the top wall so as to extend in the direction that the shock is applied, in a state positioned respectively opposite each other in pairs on a surface of the top wall opposite to the surface to which the shock is applied wherein a cross sectional shape of the main body parallel to a direction in which the shock is primarily applied is a U-shape (for example, see JP-A-2005-510393 and JP-A-2005-104164). With this type of the shock absorbing structure, by forming it from a resin molded body, an excellent moldability and lightweight properties are exhibited, and owing to an arrangement of absorbing the shock by a buckling deformation of the side wall, an ideal load displacement characteristic tracing the rectangular wave shape is ensured, and the problems associated with the shock absorbing structures of (a) and (b) described above are completely resolved.

However, with these types of shock absorbing structures of the related art, for example, depending on the size of the installation space, when the amount of an absorption of the collision energy is increased within a limited stroke, there is normally adopted a structure that raises a target load value of the load displacement characteristic within a permissible range. However, in an actual situation, it is difficult to increase the amount of the absorption of the collision energy as much as hoped for, by simply increasing a thickness of these types of side walls. On the contrary, there is caused an increase in a weight of the shock absorbing structure by increasing the thickness of the side wall. Specifically, with the shock absorbing structure of (c) described above, it is not easy to perform a tuning of the load displacement characteristic so that the amount of the absorption of the collision energy becomes a desired amount, and there is still room for improvement.

SUMMARY OF THE INVENTION

The present invention has been made in the light of the situations described above, and an object of the present invention is to provide a novel structure for a shock absorbing structure for a vehicle that enables a simple and appropriate tuning of a load displacement characteristic, so that a desired amount of collision energy can be absorbed, and a further excellent collision absorbing performance can be advantageously obtained.

In order to achieve the object, it is a principle of the present invention to provide the shock absorbing structure for a vehicle comprising a resin main body having a top wall to which a shock is to be applied, and two side walls, for absorbing the shock by being deformed by the application of the shock, integrally provided with the top wall so as to extend in the direction that the shock is applied, in the state positioned respectively opposed to each other on a surface of the top wall opposite to the surface to which the shock is applied, wherein the main body has a cross sectional shape parallel to the direction in which the shock is applied (shock-receiving direction) that is a U-shape, and wherein the side walls form a rectangular wave shape extending in a direction perpendicular to the shock-receiving direction corrugated at a plurality of corrugated sections positioned to be opposed to each other a specified distance apart in the direction perpendicular to the shock-receiving direction, and end sections of sides opposite to the top wall side of the side walls outer flanges are integrally formed so as to extend the entire length of the side walls in the direction perpendicular to the shock-receiving direction, and slits extending in the direction in which the shock is applied are respectively provided on the plurality of corrugated sections.

What is meant here by the rectangular wave shape is, in addition to a rectangular or a square wave shape, various quadrilateral wave shapes, such as a trapezoidal wave shape. In the following the rectangular wave shape refers to the same meaning.

Specifically, in the shock absorbing structure for a vehicle according to the present invention, if the width of the corrugated section, that is, a height of the rectangular wave shape of the side walls, is variously changed, or a width and a height of the slits provided in the corrugated section are regulated, for example, it is possible to advantageously increase or decrease a target load value of the load deformation characteristic, by changing a deformation strength of the side walls, without changing the thickness of the side walls, for instance.

Also, with this shock absorbing structure for the vehicle, outer flanges are integrally formed on end sections of the side walls at an opposite side to the top wall so as to extend the entire length in a direction perpendicular to the shock-receiving direction, even if a length of the slits provided in the corrugated section is sufficiently long, companion sections within the side walls positioned between companion slits that are adjacent to each other are arranged to be joined together at the outer flanges. Accordingly, because of the shape of the slits for the corrugated sections undesirable excessive reduction in the deformation strength of overall the side wall is advantageously avoided.

Also, with the shock absorbing structure for a vehicle of the present invention, slits provided in the corrugated section of the side walls are configured extending in the direction of the application of the shock, which means that cross sections of the side walls perpendicular to the shock-receiving direction are alternately lined up in a single row so that a U-shaped section opening one side of the side walls and another U-shaped section opening to another side of the side wall are arranged so as not to overlap with one another in the direction perpendicular to the shock-receiving direction. Therefore, at the time of the application of the shock, each of the U-shaped sections of the side walls is respectively bent towards the sides of the side walls, and as a result the U-shaped sections are prevented from interfering with one another as much as possible. In this way, effective stroke of the side walls at the time of shock is made sufficiently large.

Accordingly, with the shock absorbing structure for a vehicle according to the present invention, it is possible to simply and reliably tune the load displacement characteristic in an appropriate range simply by changing the width of the corrugated section or the width and the length of slits, and moreover a sufficiently large effective stroke is advantageously obtained, and as a result it becomes possible to reliably and stably ensure a desired collision energy absorption amount. As a result, it is possible to very effectively obtain a much better shock absorption performance suitably adapted for differences in size of shock due to collision, and different objects to be protected from the shock.

Also, in the shock absorbing structure for a vehicle according to the present invention, if the whole of the outer flanges are attached to the vehicle in a state contacting specified sites of the vehicle, there can be sufficiently obtained a reaction force against deformation in all of the side walls at the time the shock is applied. Therefore, there can be advantageously avoided a dependence of the shock absorption performance on a position of the shock absorbing structure to which the shock is applied.

The present invention is preferably practiced in at least the following features.

(1) A shock absorbing structure for a vehicle comprising a resin main body which includes a top wall to which a shock is to be applied and two side walls which are formed integrally with the top wall such that the two side walls respectively extend from opposite two end portions of the top wall so as to be opposed to each other, toward one of opposite sides of the top wall, which side is opposite to the other side thereof on which the shock is applied, the side walls absorb the shock by being deformed, and the resin main body has a U-shaped cross section parallel to a shock-receiving direction in which the shock is to be primarily applied, characterized in that:

each of the side walls forms a rectangular wave shape extending in a direction perpendicular to the shock-receiving direction, corrugated at a plurality of corrugated sections positioned opposing to each other a specified distance apart in the direction perpendicular to the shock-receiving direction;

an outer flange is integrally formed with the each of the side walls at an end section of the side wall opposite to a top wall side thereof, so as to be extend to an entire length of the side walls in the direction perpendicular to the shock-receiving direction; and a slit extending in the shock-receiving direction is respectively provided on each of the plurality of corrugated sections.

(2) The shock absorbing structure according to the above feature (1), wherein the slit is provided in a central section of the each of the plurality of corrugated sections in a width direction perpendicular to an extending direction of the slit.

(3) The shock absorbing structure according to the above feature (1) or (2), wherein a through-hole extending along end sections of the plurality of corrugated sections opposite to the top wall side is provided on the outer flange, so that the outer flange and the plurality of corrugated sections are disconnected.

(4) The shock absorbing structure according to any one of the above features (1) to (3), wherein an engaging section for fixing the outer flange to a specified site of the vehicle is integrally provided on a surface of the outer flange opposite to the top wall side, engaging with an engagement surface provided at the specified site of the vehicle.

(5) The shock absorbing structure according to any one of the above features (1) to (4), wherein a reinforcement rib extending continuously in a circumferential direction is integrally provided at an inner peripheral surface of at least one side edge located in the direction perpendicular to the shock-receiving direction within an inner peripheral surface defined by respective surfaces of the two side walls opposing to each other and a surface of the top wall where the side walls are provided.

In this feature, the end portion of the side wall, which has the reinforcement rib on the inner surface thereof, and which is located in the direction perpendicular to the shock-receiving direction. As a result of this, variation in the load displacement characteristic due to differences in position at which the shock is applied on the side walls is advantageously avoided, and therefore uniform shock absorbing performance is stably ensured along the entire length in a length direction perpendicular to the shock-receiving direction.

Consequently, even when a plurality of shock absorbing structures with the reinforcement ribs formed at the inner surface of the end section are arranged in the direction perpendicular to the shock-receiving direction, there can be advantageously avoided an uneven shock absorbing performance due to differences in the positions to which the shock is applied.

Accordingly, in this feature, it is possible to advantageously realize a reduction in size of the shock absorbing structure without deteriorating the shock absorbing performance. As a result, improvement in formability and reduced manufacturing cost of the shock absorbing structure due to the reduction in size are advantageously achieved.

(6) The shock absorbing structure according to any one of the above features (1) to (5), wherein the two side walls are respectively inclined such that a distance between the two side walls in the direction in which the two side walls are opposed to each other gradually increases as the side walls are away from the top wall.

(7) The shock absorbing structure according to any one of the above features (1) to (6), wherein each opposing pair of the plurality of corrugated sections are respectively inclined, so as to be close to or away from each other.

(8) The shock absorbing structure according to any one of the above features (1) to (7), wherein each opposing pair of the side walls are respectively inclined so that the plurality of corrugated sections are close to or away from each other outward from the direction in which the two side walls are opposed to each other, so as to define a trapezoid wave shape extending in the direction perpendicular to the shock-receiving direction.

(9) A structure for attaching the shock absorbing structure for a vehicle according to any one of the above features (1) to (8), characterized in that a first opposed section and a second opposed section are provided on extending members extending in the direction perpendicular to the shock-receiving direction, opposing to each other in a direction perpendicular to both an extending direction of the extending members and the shock-receiving direction and keeping a specified distance apart from each other, a pair of the outer flanges respectively formed on the two side walls are opposed to each other while each of the pair of the outer flanges is fixed to a position between the first opposed section and the second opposed section located on a rigid member, to thereby attach the shock absorbing structure for a vehicle to the vehicle via the extending sections, and in this attached state, when the side walls are deformed by the shock, the each of the pair of the outer flanges respectively contacts the first opposed section and the second opposed section, so that a displacement of the outer flanges outward from the direction in which the two side walls are opposed to each other.

According to this feature, there can be advantageously prevented an insufficient deformation of the side walls caused by a crumpling of the outer flanges before the side walls are sufficiently deformed, due to a displacement and a sliding of the outer flanges upon the extending members at the time of the deformation of the side walls due to the application of the shock, for example. Accordingly, amount of deformation of the side walls at the time of shock is sufficiently ensured, and as a result excellent shock absorbing performance is more stably exhibited.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PRESENT INVENTION

By referring to the accompanying drawings, there will be described in detail embodiments of the present invention.

First of all, a shock absorbing structure fitted at an inner side of a front bumper of a vehicle is schematically shown in FIG. 1 to FIG. 4, which are respectively a front view, a plan view and two vertical cross sections taken at different positions, as one example of a shock absorbing structure for a vehicle having the structure of the present invention. As is clear from these drawings, the shock absorbing structure 10 is integrally formed of a top wall 12 and two side walls 14a and 14b.

In more detail, this shock absorbing structure 10 is formed of a resin formed body that integrates the top wall 12 and the two side walls 14a and 14b by injection molding using an olefin type synthetic resin material that is easily subjected to a buckling deformation and has appropriate flexibility, such as polypropylene, polyethylene, polybutene.

With the shock absorbing structure 10 formed from the resin formed body, the top panel 12 is formed from a narrow plate that is long and comparatively thin, and one side surface in the thickness direction is made a convex curved surface corresponding to the internal surface shape of a front bumper cover to which the shock absorbing structure 10 is to be fitted. The one surface of the top wall 12 formed of this convex curved surface is then made a shock receiving surface 16 to which shock is applied with the shock absorbing structure 10 fitted to the inner side of the bumper cover, which will be described later. That is, in a direction perpendicular to the shock receiving surface 16 of the top wall 12, and from the shock surface 16 side towards a rear surface side 17 that is opposed to the shock surface 16 (in FIG. 8 the direction shown by arrow a), is the shock-receiving direction.

Meanwhile, the two side walls 14a and 14b are also formed of elongated plates respectively having the same thickness as the top wall 12. These two side walls 14a and 14b extend from two longer edge sections 18a and 18b extending in the longitudinal direction (in the direction perpendicular to the shock-receiving direction, the lateral direction in FIG. 2) of the rear surface 17 of the top wall 12, in the shock-receiving direction. In other words, the two side walls are provided integrally so as to extend in the shock-receiving direction in a state where they are arranged to be opposed to each other with respect to the rear surface 17 of the top wall 12. Here, the width of each side wall 14 (in FIG. 1, the vertical dimension) becomes gradually narrower from one longitudinal side going towards the other longitudinal side (from right to left in FIG. 1), in accordance with the convex curved shape of the top wall 12. That is, the height of each of the side walls 14 is constructed so as to become gradually lower from one side towards the other side in the longitudinal direction.

Also, with this shock absorbing structure 10, the two side walls 14a and 14b are made narrow in width (low in height), and a flat plate shaped connecting wall section 20 is integrally formed with the rear surface 17 of the top wall 12, at one end section on one side in the longitudinal direction. That is, a connecting wall section 20 extends from only one shorter edged section 22a of the two shorter edged sections 22a and 22b extending in the width direction of the top wall 12 (the vertical direction in FIG. 2) in the same direction as the extending direction of each of the side walls 14, and the two side walls 14a and 14b are then connected to each other by this connecting wall section 20 at corresponding end sections in the narrowed longitudinal direction. This connecting wall section 20 has the same thickness as the top wall 12 and the side walls 14, and has an overall shape that is trapezoidal with the width of an edge section away from the top wall 12 being wider than the width of an end section at the top wall 12 side, and is inclined so as to become gradually further away from the other shorter edged section 22b as it is away from the top wall 12.

Figure 3:
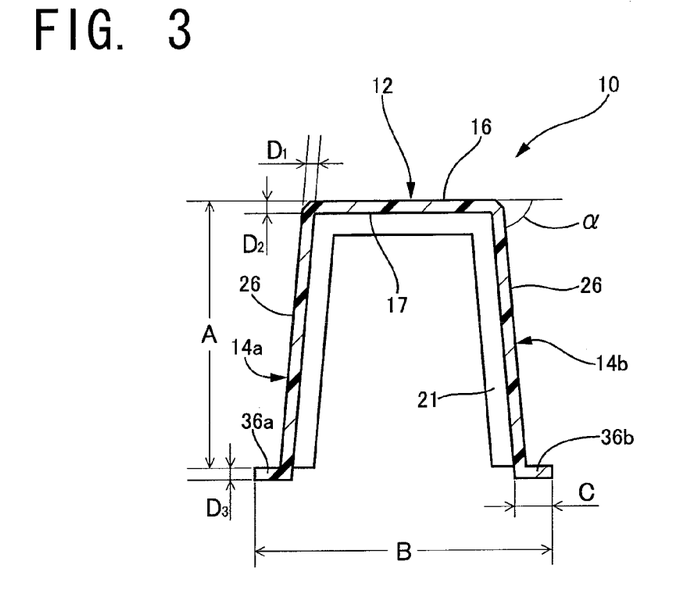
FIG. 3 is an enlarged cross sectional explanatory view taken along line III-III of FIG. 1.
Figure 5:
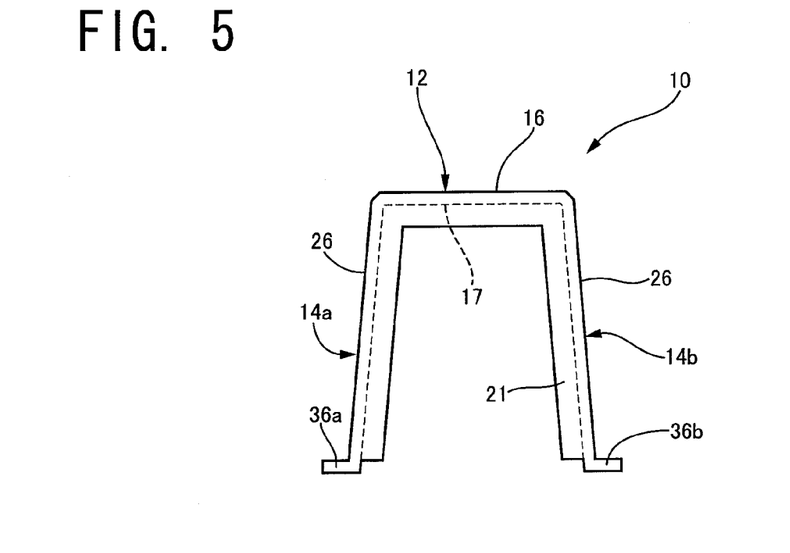
FIG. 5 is an explanatory end view in the direction looking in the direction of arrow V in FIG. 1.

Meanwhile, as will be clear from FIG. 3 and FIG. 5, with this shock absorbing structure 10, a reinforcement rib 21 is integrally provided on an inner surface of an end section that is opposite, in the longitudinal direction, to the side where the connecting wall section 20 is provided. This reinforcement rib 21 is formed of a narrow, thin-walled flat plate, projecting to a specified height at edge sections of the widened side of the surfaces of the two side walls 14a and 14b (the right side in FIG. 1), and at an edge section of the rear surface 17 of the top wall 12. The reinforcement rib 21 is continuously provided, so as to form a gate-like shape as a whole. One side surface in the thickness direction is positioned so as to be flush with the respective end surfaces of each side wall 14 and the top wall 12. In this way, deformation strength of the end section where the height of each side wall 14 is increased is appropriately increased.

In this embodiment, in particular, the two side walls 14a and 14b are respectively formed tracing a rectangular wave shape, and extended in the longitudinal direction, that is, a direction perpendicular to the shock-receiving direction. That is, a plurality of corrugated sections 24, with ridges formed so that the side walls 14 curve at an angle that is larger by a specified amount than a right angle, are formed in each side wall 14 arranged opposite to each other a specified distance apart in the direction perpendicular to the shock-receiving direction. Also, rectangular ridge sections 26 projecting towards one side in the plate thickness direction, with a pair of corrugated sections 24 positioned opposite to each other as side sections, and groove sections 28 sunken in the direction of one side in the plate thickness direction, with the pair of corrugated sections 24 positioned opposite to each other as side sections, are formed in each of these side walls 14, alternately connected in the direction perpendicular to the shock-receiving direction.

These two side walls 14a and 14b then have a pair of flat apex sections of each ridge section 26 extending in the longitudinal direction of each side wall, and a pair of flat bottom sites of each groove section 28 extending in the longitudinal direction of each side wall 14, positioned opposite to each other, and also, in a state where each ridge section 26 is arranged projecting outwards away from the other of the pair, with each groove section 28 is arranged sinking inwards away from the other of the pair, the side walls 14 extend from the two elongated edge sections 18a, 18b of the rear surface 17 of the top wall 12 in the shock-receiving direction.

In other words, the top wall 12 is provided with a plurality of narrowed sections and widened sections that are connected together, and overall traces a long and narrow corrugated rectangular wave shape, and each of the side walls 14a and 14b are integrally provided on the rear surface 17 of the top plate section 12 in a state where the respective ridge section 26 of the two side walls 14a and 14b are positioned corresponding to each widened section of the top wall 12, the respective groove sections 28 of the two side walls 14a and 14b are positioned corresponding to each narrowed section of the top plate section 12. Here, all of the pairs of the apex sections of the respective ridge sections 26 and the pairs of the bottom sites of the groove sections 28, and further the apex sections of the ridge sections 26 and the bottom sections of the groove sections 28, have substantially the same thickness.

Figure 2:
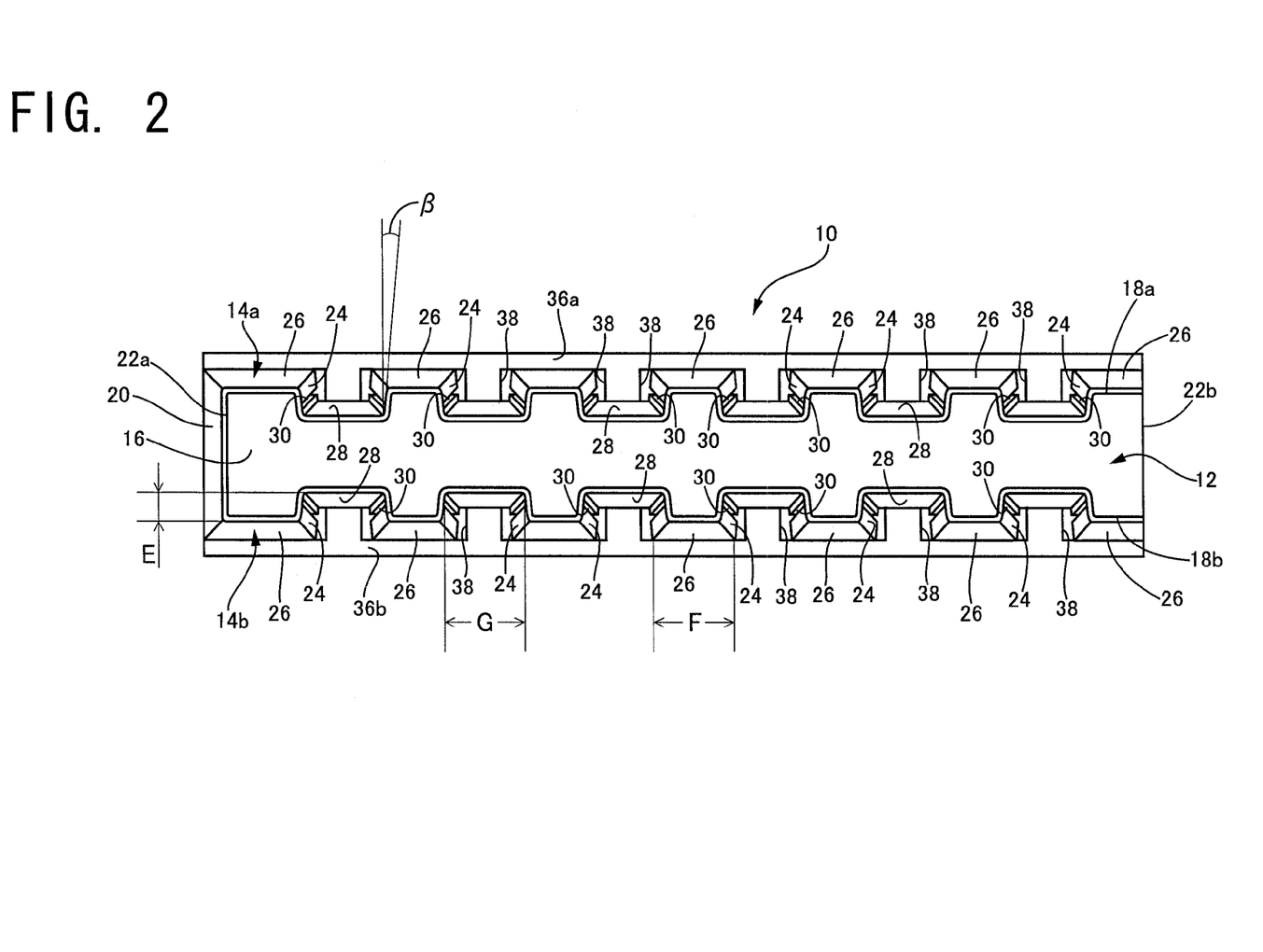
FIG. 2 is a plan explanatory view of the shock absorbing structure for a vehicle shown in FIG. 1.

Also, in this embodiment, as shown in FIG. 2 and FIG. 3, with the two side walls 14a and 14b integrally provided on the rear surface 17 of the top wall 12, the side walls are inclined so as to move apart from each other as the side walls are away from the top wall 12.

Figure 1:
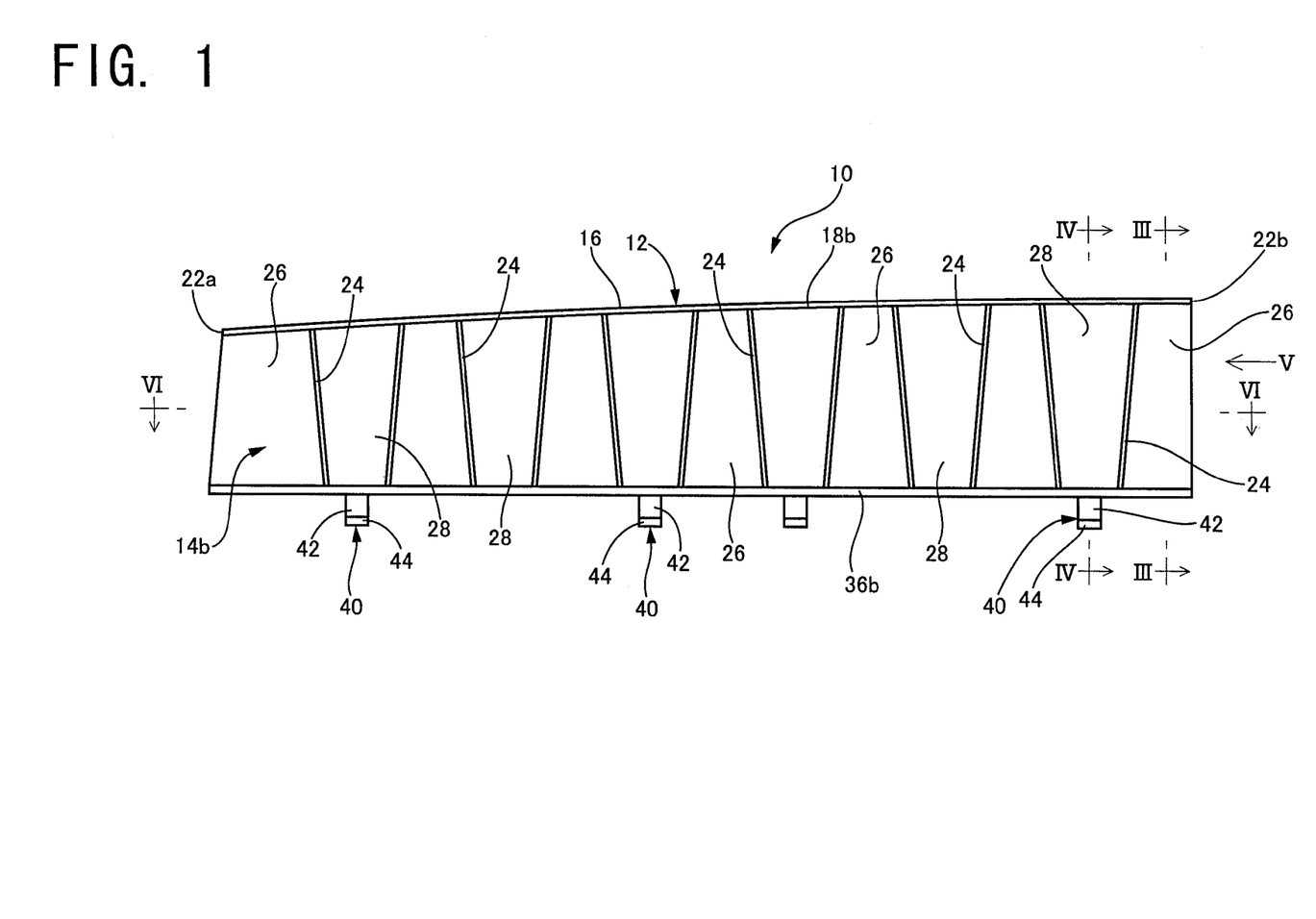
FIG. 1 is a front explanatory view showing one embodiment of a shock absorbing structure for a vehicle constructed according to the present invention.
Figure 4:
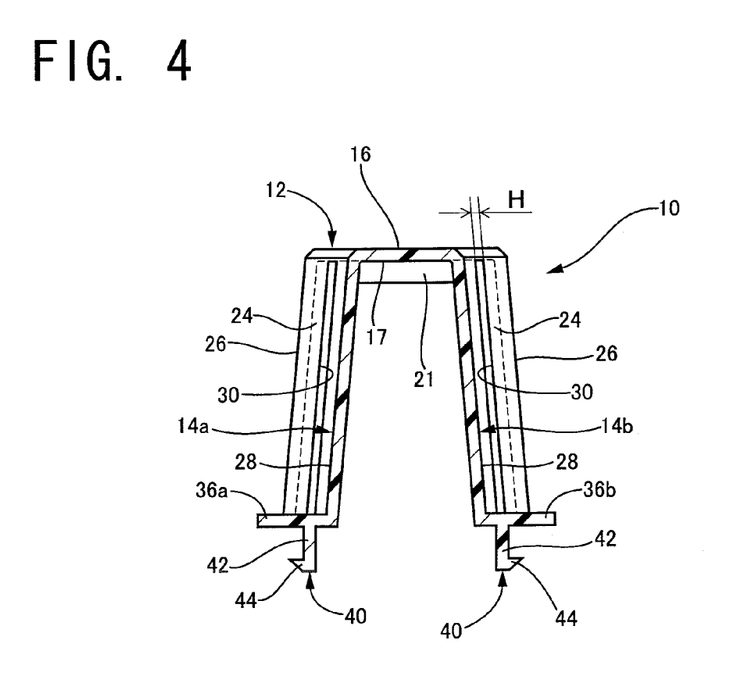
FIG. 4 is an enlarged cross sectional explanatory view taken along line IV-IV of FIG. 1.

Further, as shown in FIG. 1, FIG. 2 and FIG. 4, of the plurality of corrugated sections 24 of each side wall 14, the pair of the corrugated sections 24 that are positioned opposite to each other and constitute a side section of a ridge section 26 are respectively inclined so as to be apart from each other as the corrugated sections 24 are away from the top wall 12, and to be closer to each other as the corrugated sections 24 are closer to the front in the projecting direction of the ridge sections 26 (outwards of the opposing direction of the two side walls 14a, 14b).

Further, among the plurality of corrugated sections 24, the pair of the corrugated sections 24 that are positioned opposite to each other and constitute a side section of a groove section 28 are respectively inclined so as to be closer to each other as the corrugated sections 24 are away from the top wall 12, and to be away from each other as the corrugated sections 24 are closer to an opening side of the groove sections 28 (outwards of the opposing direction of the two side walls 14a, 14b).

Particularly with these corrugated sections 24, slits 30 are formed in central parts of the corrugated sections 24 in a thickness direction (a direction perpendicular to the direction in which they project from the top wall 12, the vertical direction in FIG. 2). A slit 30 spans the entire length of a corrugated section 24 from the rear surface of the top wall 12, and presents a long and narrow rectangular wave extending continuously in a straight line.

Therefore, with the shock absorbing structure of this embodiment the two side walls 14a and 14b are formed into a rectangular wave shape drawn in the direction perpendicular to the shock-receiving direction, specifically, a trapezoidal wave shape which is a type of rectangle. Also, a cross section of each side wall 14 parallel to the shock-receiving direction a square U-shape gradually widening towards the opening part, at the section where the ridge sections are formed, and also at the sections where the groove sections 28 are formed.

Figure 6:
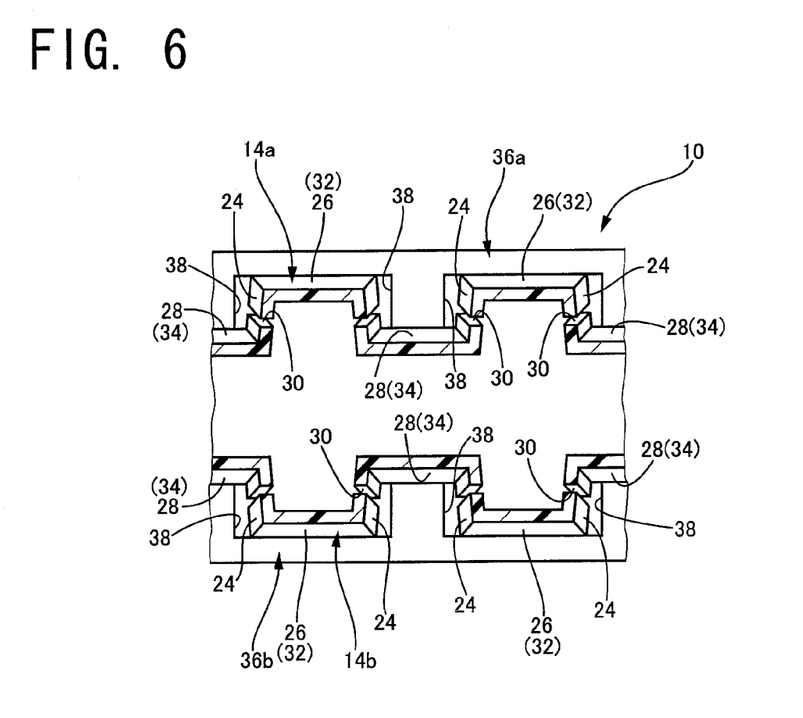
FIG. 6 is a partially enlarged cross sectional explanatory view taken along line VI-VI of FIG. 1.

As shown in FIG. 6, a cross section of each side wall 14 perpendicular to the shock-receiving direction also has a U-shape of which the width is gradually wider towards the opening section, at sections where the ridge sections 26 are formed and at sections where the groove sections 28 are formed, divided by the slits 30. That is here, at the flat apex sections of the ridge sections 26 and sections of each corrugated section 24 from the apex section of each ridge section 26 to the slit 30, the cross section of each side wall 14 perpendicular to the shock-receiving direction is an outwardly opening U-shaped section 32 opening to a direction inward of the direction in which the two side walls 14a and 14b are opposed to each other, and forming a U-shape becoming gradually wider towards the opening section, while at the flat bottom sections of the groove sections 28 and from the bottom section of each groove section 28 of each corrugated section 24 to the slit 30, the cross section of each side wall perpendicular to the shock-receiving direction is an inwardly opening U-shaped section 34 opening to a direction outward of the direction in which the two side walls 14a and 14b are opposed to each other, and forming a U-shape becoming gradually wider towards the opening section. Then, these outwardly opening U-shaped sections 32 and inwardly opening U-shaped sections 34 are arranged alternately so that the opening sections do not overlap in a direction perpendicular to the shock-receiving direction, to form each side wall 14.

Also, as will be clear from FIG. 1 to FIG. 4, an outer flange 36 is integrally formed on the end section of each side wall 14 which has a structure as described above opposite the top wall 12 side. The outer flange 36 is formed of a flat plate having substantially the same thickness as that of the top wall 12 and that of each of the side walls 14, and is integrally formed on the end edge section of the flat apex section of the ridge section 26 and the end edge section of the flat bottom section of the groove section 28, of each of the side walls 14, projecting to a specified height towards the outside in the direction in which the two side walls 14a and 14b are opposed, so as to continuously extend along the entire length of the side walls 14 in the longitudinal direction.

Further, in this type of outer flange 36, through-holes 38 extending along each of the corrugated sections 24 are provided in sections of the groove sections 28 extending from the end edge sections of the bottom edge sections, namely, in all sections formed between the pair of the corrugated sections 24 positioned opposite to each other.

In this way, the apex sections of the ridge sections 26 and the bottom sections of the groove section 28, of the side walls 14, are respectively connected to the outer flange 36 at the opposite side to the top wall 12 side, and also connected to each other via the outer flange 36. Meanwhile, associated adjacent ones of the corrugated sections 24 are connected to each other by means of either the apex sections of the ridge sections 26 and the bottom sections of the groove sections 28, or by means of the top wall 12, and are not connected to the outer flange 36.

Also, as shown in FIG. 1 and FIG. 4, engagement clips are respectively integrally provided at a plurality of places (four in this case) on a rear surface (a surface opposite to the top wall 12) of the sections of the outer flange 36 extending from the end edge sections of the bottom sites of the grooves 28, as engagement sections, separated by intervals in the length direction. These engagement clips 40 are integrally provided in a projecting manner on the rear surface of the outer flanges 36 and having a specified thickness and height, and have a flat plate shaped strut section 42 capable of warping or elastically deforming in the thickness direction, and hook sections 44 having a triangular cross section integrally formed on a surface of the end of the strut section 42 opposite to the bottom site side of the groove section 28.

Figure 7:
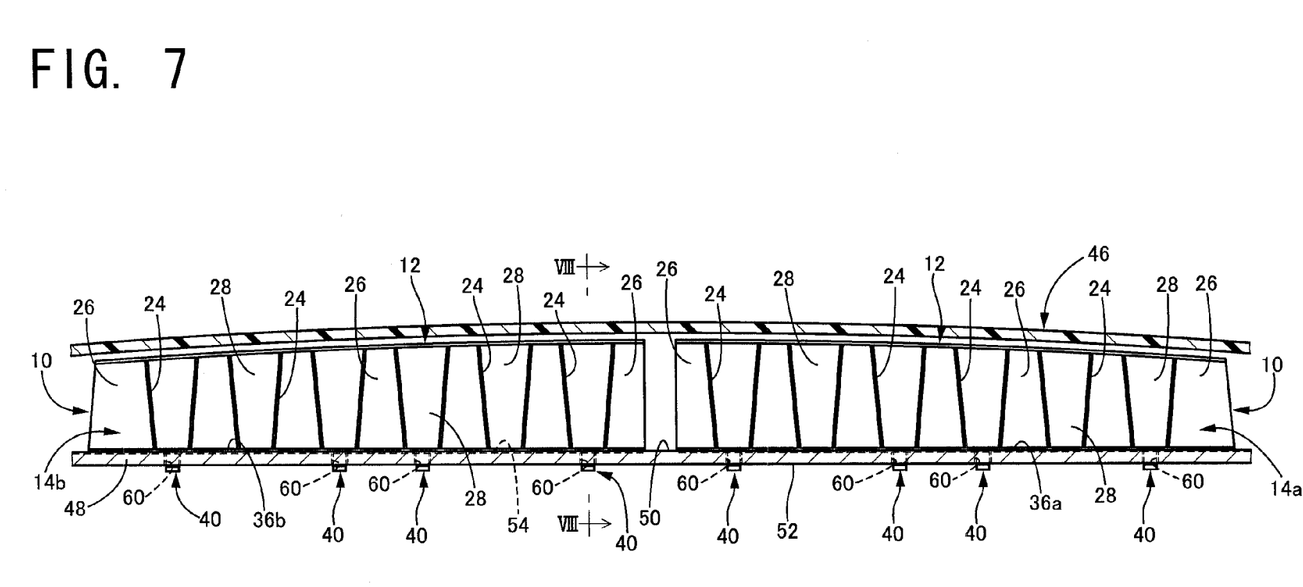
FIG. 7 is a vertical cross sectional explanatory view showing a state where the shock absorbing structure for a vehicle shown in FIG. 1 is fitted at an inner side of a bumper cover of a front bumper.
Figure 8:
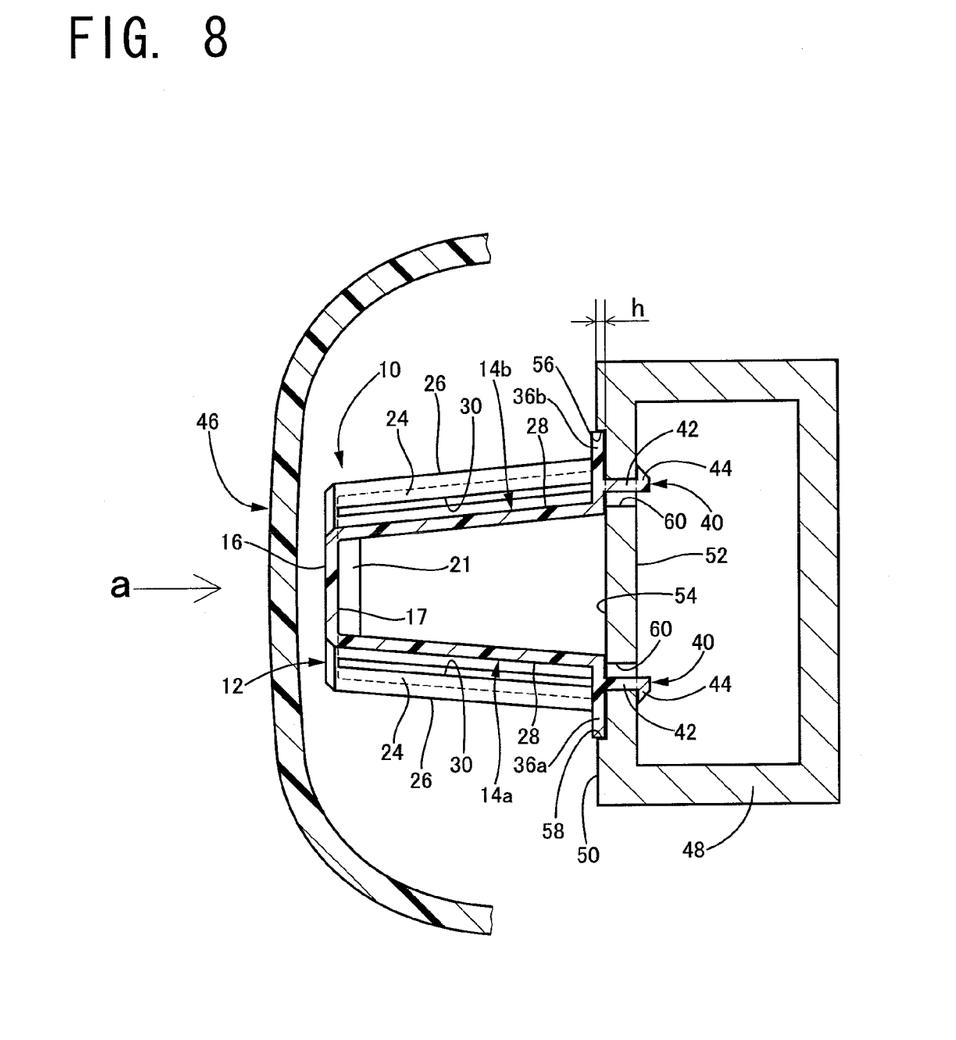
FIG. 8 is an enlarged cross sectional explanatory view taken along line VIII-VIII of FIG. 7.

Furthermore, as shown in FIG. 7 and FIG. 8 for example, the shock absorbing structure 10 which has the above-described structure is attached between a bumper cover 46 of the front bumper and a bumper reinforcement 48 fitted to the front section of the vehicle body.

In more detail, the bumper cover 46 is made from a specified synthetic resin material, having a convex curved shape, and is arranged at specified sites on a front of the vehicle body so as to extend in the vehicle width direction. Meanwhile, the bumper reinforcement 48 is formed of a hollow longitudinally extruded material which is made of metal and having a high rigidity, is fixed to a specified site on the front of the vehicle body positioned opposite to the bumper cover 46 keeping a specified distance in between the bumper cover 46 and the rear of the vehicle.

Also, a surface of a section of the bumper reinforcement 48 opposite to the bumper cover 46 is made as a flat attachment surface 50, and a rear surface of the attachment surface (inner side surface) is made as a flat engagement surface 52. Further, a shallow rectangular groove 54 is formed in a central section in a width direction of the attachment surface 50 of the bumper reinforcement 48, so as to extend in a longitudinal direction, that is, continuously in the vehicle width direction. Two surfaces of the groove 54 then face each other in the vertical direction and are made as a first opposed section 56 and as a second opposed section 58 extending continuously on the vehicle width direction, and two rectangular through holes 60 arranged in the width direction are respectively formed in the bottom of the groove 54 at positions specified distance apart in the length direction of the groove 54.

Here, two shock absorbing structures 10, 10 are arranged between the bumper cover 46 and the bumper reinforcement 48, with the pair of the end sections at one end side of each side wall 14 in the longitudinal direction that are increased in height being positioned opposite to each other at a central part in the width direction of the vehicle, and other end sections in the longitudinal direction of each side wall 14 having a decreased height being respectively positioned an either end section in the vehicle width direction. Also, each of these shock absorbing structures 10 has a shock surface 16 of the top wall 12 opposed to the inner surface of the bumper cover 46 with a small gap between them, the two side walls 14a and 14b positioned opposite to each other in a vertical direction, and the top wall 12 and two side walls 14a and 14b are positioned so as to extend in the vehicle width direction. Under these conditions, respective tip end surfaces of the two side walls 14a and 14b (end surface where the outer flanges 36a and 36b are formed) and a surface of the outer flanges 36 opposite to the top wall 12 side contact the bottom surface of the groove 54 provided in the attachment surface 50 of the bumper reinforcement 48, and at the same time the tip surfaces of the two side walls 14a and 14b in the projection direction of each outer flange 36a, 36b respectively come into contact with the first opposed section 56 and the second opposed section 58 of the groove 54.

In this arrangement, the strut sections 42 of the plurality of engagement clips 40 integrally formed on the rear surface of each outer flange 36 are inserted into the plurality of through holes 60 provided in the bottom section of the groove 54 of the bumper reinforcement 48 to engage the hook sections 44 of each of the engagement clips 40 with the engagement surface 52 of the bumper reinforcement 48. In this way, the two shock absorbing structures 10, 10 are fixed to the bumper reinforcement 48 in a state with each side wall 14 extending in the shock-receiving direction. As will be clear from this, here extension members are constituted by the bumper reinforcement 48. Also, the extension members may be constituted by the bumper cover 46, and the shock absorbing structure 10 may be attached to the inner surface of the bumper cover 46.

Therefore, with this embodiment, when a leg of pedestrian (not shown) is come to contact or collided with the bumper cover 46, while the vehicle is traveling, for instance, this shock is applied via the bumper cover 46 to the both of, or one of the top walls 12 of the two shock absorbing structures 10, 10, in the direction of the arrow (a) in FIG. 8. In this way, the two side walls 14a and 14b of each of the shock absorbing structures 10 are sandwiched between the bumper cover 46 and the bumper reinforcement 48, and subjected to the buckling deformation for thereby absorbing the energy of the collision.

Also, in this embodiment, a plurality of corrugated sections 24 are respectively provided on the two side walls 14a and 14b of the shock absorbing structure 10, and each of these side walls 14 is continuously provided with the ridge sections 26 and the groove sections 28 forming a trapezoidal wave shape extending in a direction perpendicular to the shock-receiving direction. Therefore, even if the side wall is formed of a comparatively thin wall, an appropriate deformation strength is ensured in each side wall 14. Accordingly, lightweight characteristics are maintained while a sufficient amount of shock energy is advantageously absorbed.

Also, in this embodiment, the ridge sections 26 and the groove sections 28 of each side wall 14 are divided in two by forming the slits 30 in all of the corrugated sections 24 provided on each side wall 14, and outer U-shaped sections 32 and inner U-shaped sections 34 of each of the side walls 14 are arranged alternately so that opening sections of the outer and inner U-shaped sections 32 and 34 do not overlap to one another. As a result, at the time of an application of the shock, each of the side walls 14 is subjected to the buckling deformation so that the outer U-shaped sections 32 and the inner U-shaped sections 34 are subjected to a bending deformation in the direction in which they respectively open out, along the direction in which the two side walls 14a and 14b are opposed to each other. In this way, contact of each side wall in a deformed state, and interference with each other is prevented as much as possible, and as a result a sufficiently large effective stroke is ensured in each side wall 14.

Here, since the outer flanges 36 are attached to the tip ends of each of the side walls 14, the outer U-shaped section 32 and the inner U-shaped sections 34 are connected to each other by the top wall 12 and the outer flanges 36, even if slits 30 are formed in the corrugated sections 24 so as to extend along their entire length. Accordingly, because of the shape of the slits 30 for the corrugated sections 24 undesirable excessive reduction in the deformation strength of each of the side walls 14 overall is advantageously avoided.

Also, as described above, the two side walls 14a and 14b are respectively inclined so as to be apart from each other as the side walls 14a and 14b are away from the top wall 12. In addition, each pair of the corrugated sections 24 provided on each of these side walls 14 are inclined opposing to each other such that a distance between the pair of the corrugated sections 24 are gradually increased as the pair of the corrugated sections 24 are away from the top wall 12, and also inclined so as to be apart from each other or close to each other outwardly with respect to the direction in which the two side walls 14a and 14b are opposed to each other. Owing to this arrangement, the two side walls 14a and 14b of each shock absorbing structure 10 are subjected to the buckling deformation, the deformed set of side walls 14 are prevented from contacting and interfering with each other as much as possible, and an effective stroke length of each side wall is sufficiently ensured.

The shock absorbing member 10 is attached to the attachment surface 50 of the bumper reinforcement 48, with the outer flanges 36a, 36b integrally formed on each tip end section of the two side walls 14a, 14b having tip surfaces are respectively contacting the first opposed section 56 and the second opposed section 58 provided on the attachment surface 50 of the bumper reinforcement 48, in a way that the first and second opposed sections 56, 58 are positioned so as to be opposed to each other in the vertical direction. According to this arrangement, there is advantageously prevented deformation of the outer flanges 36a and 36b of the two side walls 14a and 14b such that they move apart from each other outwardly in the direction in which the two side walls 14a and 14b are opposed to each other at the time the buckling deformation is occurred due to the application of the shock, regardless of the inwardly sloping inclination state of the two side walls 14a and 14b as described above. As a result, there is also effectively prevented that the side walls 14 from collapsing forward before being subjected to a sufficient amount of the buckling deformation which leads to an insufficient deformation, so that the shock energy can be sufficiently and reliably absorbed. In order to ensure these characteristics, the height of each of the first opposed section 56 and the second opposed section 58 (the dimension h in FIG. 8) is preferably 2 mm or more.

Also, a through-hole 38 is provided on the outer flanges 36, so that the corrugated sections 24 and the outer flanges 36 are not connected to each other. Because of this, at the time of buckling deformation of each side wall 14 due to the shock, there is constraint of each corrugated section 24 to the outer flanges 36, which advantageously increases the degree of freedom for the shape and the displacement of each of these corrugated sections 24. Therefore, residual crumpling of not only each corrugated section 24 but also each side wall 14 is effectively eliminated or made smaller, and because of this also, the effective stroke of each side wall 14 is more advantageously increased.

Also, in this embodiment, the end sections where the height of each of the respective side walls 14 of the two shock absorbing structures 10 is low, and the connecting wall sections 20 for connecting such end sections that are associated with each other, are positioned at an inner side of the bumper cover 46 located at an end section in the vehicle width direction. As a result of this, even when the shock is applied to this type of the bumper cover 46, regardless of the fact that the height of the end sections of each side wall 14 positioned opposite is low, the end sections of each side wall 14 and the connecting sections 20 connecting the end sections are subjected to the buckling deformation together, whereby the shock energy can be sufficiently absorbed.

Meanwhile, high end sections, of which the deformation strength is suitably enhanced by being provided with the reinforcement ribs 21, are positioned at an inner side to appropriately increased displacement strength are positioned at an inner side within each of the respective side walls 14 of the two shock absorbing structures 10, 10, of the bumper cover 46 positioned in the middle in the vehicle width direction. As a result, when the shock is applied to the bumper cover 46 positioned in the middle in the vehicle width direction, although a joint section of the two shock absorbing structures 10 is positioned at the inner side of the bumper cover 46, the shock energy can be sufficiently absorbed by the buckling deformation of each side wall 14 reinforced by the reinforcement rib 21.

Therefore, even if the leg etc. of a pedestrian contact or collide with any position of the bumper cover 46 in the width direction of the vehicle, regardless of the contact position, the shock energy generated by the shock can be sufficiently absorbed by the two shock absorbing structures 10,10 fixed to the inner side of the bumper cover 46, whereby the safety of the pedestrian can be more advantageously designed. Also, in this manner, the shock energy applied to the bumper cover 46 is extremely efficiently absorbed using the two shock absorbing structures 10,10, and so it is possible to effectively shorten the overall length of the shock absorbing structure 10 fitted at the inner side of the bumper cover 46, enabling a reduction in size of the shock absorbing structure 10. In this way, improvement in manufacturability and reduction in the manufacturing cost of the shock absorbing structure 10 accompanying this reduction in size can be effectively realized.

In order for the shock absorbing structure 10 to more efficiently display the above described characteristics, for example, the height of each side wall 14 (the dimension shown by A in FIG. 3) is preferably in the range of 30-300 mm. The reason for this is that if the height of each side wall 14 is less than 30 mm, it is so low that it is difficult to obtain a sufficient shock stroke, while if the height of each side wall 14 is higher than 300 mm the overall shock absorbing structure is made excessively large, and it is difficult to arrange within the limited installation space. In this embodiment, the height of each side wall 14 is 100 mm.

Also, the maximum width of the shock absorbing structure 10 overall, in other words the dimension from a tip end of the outer flange 36a provided on one side wall 14a to the tip end of the outer flange 36b provided on the other side wall 14b (the dimension shown by B in FIG. 3) is also suitably within the range of 30-300 mm. This is because if the maximum width of the shock absorbing structure 10 overall is less than 30 mm, then there is an anxiety, at the time of the application of the shock, of an inconvenience arising where the entire shock absorbing structure 10 collapses before each side wall 14 has sufficiently deformed, while if the maximum width is in excess of 300 mm, the shock absorbing structure 10 overall is excessively large and it will be difficult to arrange within the limited installation space. In this embodiment, the maximum overall width of the shock absorbing structure 10 is 100 mm.

Further, the width of the outer flange 36 (the dimension shown by C in FIG. 3) is preferably a value within a range of 5-50 mm. The reason for this is that if the width is less than 5 mm, for example, then when the length of the slits 30 is made sufficiently long, the connecting strength between the inner and outer U-shaped sections 32 and 34 of the side walls 14 and the outer flanges 36 is so small that there is an anxiety that the overall deformation strength of the side walls 14 becomes excessively small, while if the width of the outer flanges 36 is greater than 50 mm, the overall shock absorbing structure 10 will become excessively large and it will be difficult to fit in the limited installation space. In this embodiment, the width of the outer flanges 36 is made 5 mm.

Still further, the respective plate thicknesses of the top wall 12, side walls 14 and outer flanges 36 (the dimensions shown by $D_1$, $D_2$ and $D_3$ in FIG. 3) are preferably in a range of about 0.6 to about 5.0 mm. The reason for this is that if the plate thickness of each of these sections is less than 0.6 mm, the plate is excessively thin, so that the deformation strength becomes excessively small and there is an anxiety that the amount of the shock energy absorbed by the deformation will be insufficient. Also, if the plate thickness of each of these sections is greater than 5.0 mm, the plate is too thick, which will make the deformation strength excessively large and it will be difficult to obtain a sufficient amount of the deformation due to the shock, and as a result of that there is an anxiety that the desired shock absorbing characteristics will not be obtained. In this embodiment the respective thicknesses of the top wall 12, the side walls 14 and the outer flanges 36 are 2.0 mm, 2.5 mm and 2.0 mm.

Also, the width of the corrugated sections 24 (the dimension shown by E in FIG. 2) is preferably within a range of 5-100 mm. The reason for this is that if the width of the corrugated sections 24 is less than 5 mm, the corrugated section 24 is too small, meaning that it will be difficult for the side sections 14 provided with the corrugated sections 24 to sufficiently obtain the above-described advantage exhibited by the rectangular waveform, while if the width of the corrugated sections 24 is in excess of 100 mm the shock absorbing structure 10 will be too large overall, and it will not be easy to fit into the limited installation space. In this embodiment, the width of the corrugated sections 24 is made 15 mm.

Further, the respective maximum widths of the ridge sections 26 and the groove sections 28 of the side walls 14, in other words the respective maximum widths of the outer flanges sections of the outer U-shaped sections 32 and the bottom sections of the inner U-shaped sections 34 (the dimensions shown by F and G in FIG. 2), are preferably in a range of 10 to 100 mm. The reason for this is that if the respective maximum thicknesses of the ridge sections 26 and the groove sections 28 are less than 10 mm, the distance between a pair of the corrugated sections 24 that are adjacent to each other will become narrow, and there is an anxiety of a problem arising where the pair of the adjacent corrugated sections 24 and the pair of the side walls 14 joined to these corrugated sections 24 will contact with each other at the time of the application of the shock, interfering with each other. Also, in the event that the respective maximum widths of the ridge sections 26 and the groove sections 28, exceed 100 mm, the distance between the pair of corrugated sections 24 that are adjacent to each other is now excessively large, and as a result there is an anxiety of disadvantageously bringing about position dependence of the shock absorbing performance (shock position dependence or collision position dependence), which is where the deformation load characteristic varies depending on the position of the application of the shock (shock position or collision position). In this embodiment the maximum widths of the ridge sections 26 and the groove sections 28 are respectively 30 mm.

Still further, the width of the slits 30 (the dimension shown by H in FIG. 4) is preferably about 3 to about 60 mm. The reason for this is that in the event that the slits 30 have a width smaller than 3 mm, they are too narrow, which means that there is an anxiety that the advantage obtained by the deformation of the slits 30 in the corrugated sections 24 will not be sufficiently demonstrated, while if the slits 30 have a thickness larger than 60 mm, the deformation strength of not only the corrugated sections 24 but also the side walls 14 becomes small. In this embodiment, the width of the slits 30 is made 5 mm.

Also, the size of the angle formed by the side walls 14 and the top wall 12 (the angle shown by α in FIG. 3) is preferably within a range of 70 to 90 degrees. The reason for this is that if this angle is less than 70°, the gradient is too gentle, and as a result of this the side walls 14 collapse before sufficiently buckling deformed at the time of the application of the shock and there is a possibility of insufficient deformation of the side walls 14. Also, if the angle is greater than 90°, the two side walls 14a and 14b form an inwardly sloping shape, and as a result the deformed section contact with each other at the time of the deformation of each of the side walls 14 and interfere with each other, so that there is an anxiety that the effective stroke will be reduced. As will be clear from the preferred range for this angle, in the present invention there is no problem whatsoever even if the side walls 14 are formed so as to extend perpendicularly from the rear surface 17 of the top wall 12. Also, in this embodiment the angle formed by the side walls 14 and the top wall 12 is 85°.

Further, the angle formed by the corrugated sections 24 with the apex sections of the ridge sections 26 and the bottom sites of the groove section 28 of the side walls 14 (the angle shown by β in FIG. 2) is preferably in a range of 0 to about 45°. The reason for this is that if the angle is less than 0°, the cross sectional shape of the side walls 14 perpendicular to the shock-receiving direction will become a dovetail groove shape, and as a result the deformed sections of the corrugated section 24 contact with each other at the time of the deformation of the side walls 14 and interfere with each other, so that there is an anxiety that effective stroke will be reduced. Also, if the angle is comparatively large, exceeding 45°, there is the disadvantage that it is difficult to ensure sufficient deformation load. As will also be clear from the preferred range for this angle, with the present invention there is no problem whatsoever even if the corrugated sections 24 are formed so as to extend perpendicularly from the apex sections of the ridge sections 26 or the bottom of the groove sections 28. Also, in this embodiment the angles formed by the corrugated sections 24 with the apex sections of the ridge sections 26 and the bottom sites of the groove sections 28 of the side walls 14, and the angle formed by the side walls 14 with the top wall 12 are respectively made 5°.

As described in detail above, with the shock absorbing structure 10 of this embodiment, for example, when the leg of the pedestrian (not shown in the drawings) contacts or collides with the bumper cover 46 while the vehicle is traveling, the shock energy resulting from this contact or collision is sufficiently and reliably absorbed, and as a result the leg etc, of the pedestrian is advantageously protected and the safety of the pedestrian is extremely effectively ensured.

In this shock absorbing structure 10, in particular, as a result of various changes in the width of the corrugated sections 24, that is, the height of the trapezoidal wave shape of the side walls 14, or regulation of the width and length of the slits 30 provided in the corrugated sections 24, for example, the deformation strength of each of the side walls 14 is changed without changing the thickness etc., of the side walls 14, and it possible to easily and reliably tune the load deformation characteristic within a suitable range.

Accordingly, in this type of shock absorbing structure 10 of this embodiment, it becomes possible to reliably and stably ensure the desired shock energy absorption amount by the extremely simple design changes such as changing only the width of the corrugated sections 24 or the width and the length of the slits 30. As a result, it is possible, for example, to extremely effectively obtain a much better shock absorbing performance that is sufficiently adapted to the extent of the shock due to the collision, and the objects to be protected from the shock.

Also, in this shock absorbing structure 10, since the slits 30 are provided in a middle section in the width direction of the corrugated sections 24, the both side sections of the corrugated sections 24 which sandwiches the slits 30, that is, the width of the leg sections of the outer U-shaped sections 32 and the inner U-shaped sections 34 of each of the side walls 14, are made substantially the same, and as a result of this these outer U-shaped sections 32 and inner U-shaped sections 34 have the same deformation strength as each other. Accordingly, the deformation strength of each side wall 14 is made uniform in the longitudinal direction, and variation in the load displacement characteristic due to differences in the shock position on the side walls is advantageously restricted, and accordingly stable shock absorbing performance can be effectively ensured.

Further, in this embodiment, with a one touch operation of inserting the engagement clips 40 integrally formed on the rear surface of the outer flanges 36 of each side wall 14 into the through holes 60 of the bumper reinforcement 48 and attaching to the bumper reinforcement 48, an attachment operation of the shock absorbing structure to the vehicle body is made simple. Also, as the engagement clips 40 are provided on the rear surface of the outer flanges 36, the deformation of each of the side walls 14 due to the application of the shock is not hindered by the engagement clips 40, and as a result the stable shock absorbing performance can be advantageously ensured.

Experiments performed by the present inventors in order to confirm that the shock absorbing structure 10 in this embodiment exhibits the above described characteristics will now be described in detail.

Specifically, first of all a shock absorbing structure having the configuration shown in FIG. 1 to FIG. 4 was manufactured and prepared, and this was made Test item 1. The shock absorbing structure of this Test item 1 was manufactured by injection molding using polypropylene. Also, dimensional specifications of each section are the same as the dimensions shown in the previously described embodiment.

Then, the shock absorbing structure of Test item 1 prepared in this way was fixed on a specified platform using the engagement clips provided on the outer flanges, and a collision test was conducted by colliding an shocker weighing 9.5 kg with the top wall at a speed of 40 km/h, using a known method. After that the load deformation characteristic of the shock absorbing structure of Test item 1 was examined using a conventional method, based on measured values etc., obtained by using an accelerometer fitted to the shocker. The results are shown in FIG. 9.

Figure 9:
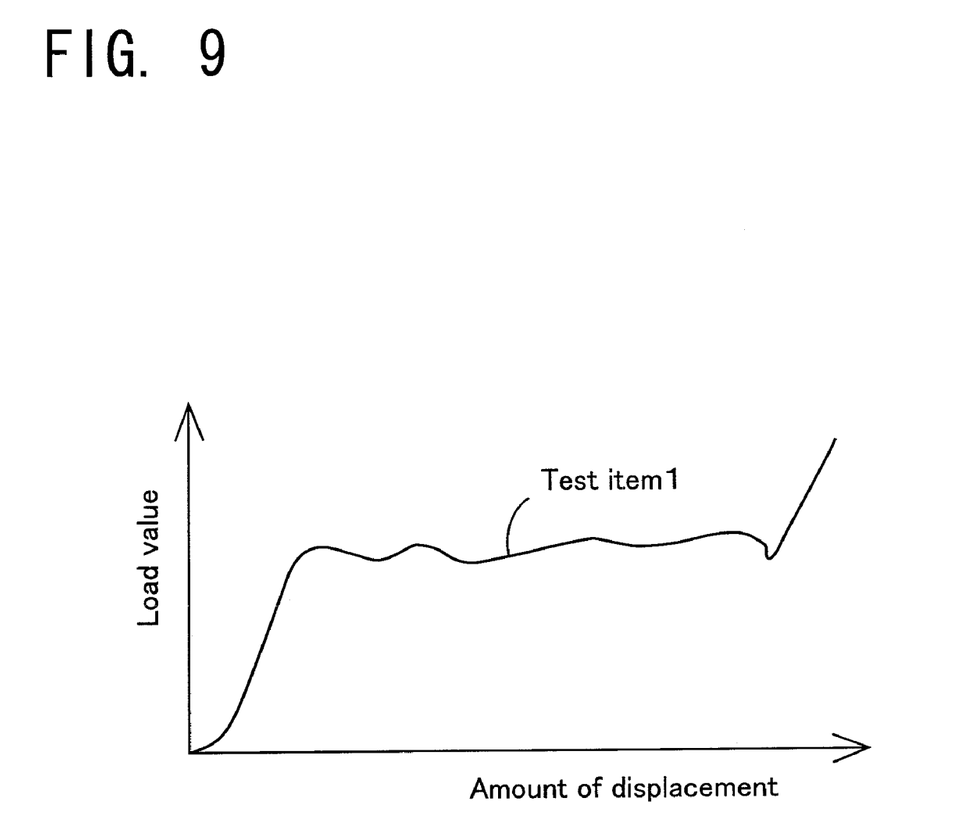
FIG. 9 is a graph showing a load displacement characteristic of the shock absorbing structure for a vehicle shown in FIG. 1.

As will be clear from FIG. 9, with the shock absorbing structure of Test item 1 having the structure of the present invention, with respect to the initial stages of shock, a load value suddenly increases with a small amount of displacement. Subsequently, there is confirmed that there can be obtained an ideal load displacement characteristic (load displacement curve) tracing a rectangular pulse, e.g., the load displacement characteristic in which the amount of displacement of the load value changes substantially constantly, regardless of increase in the amount of displacement.

Figure 10:
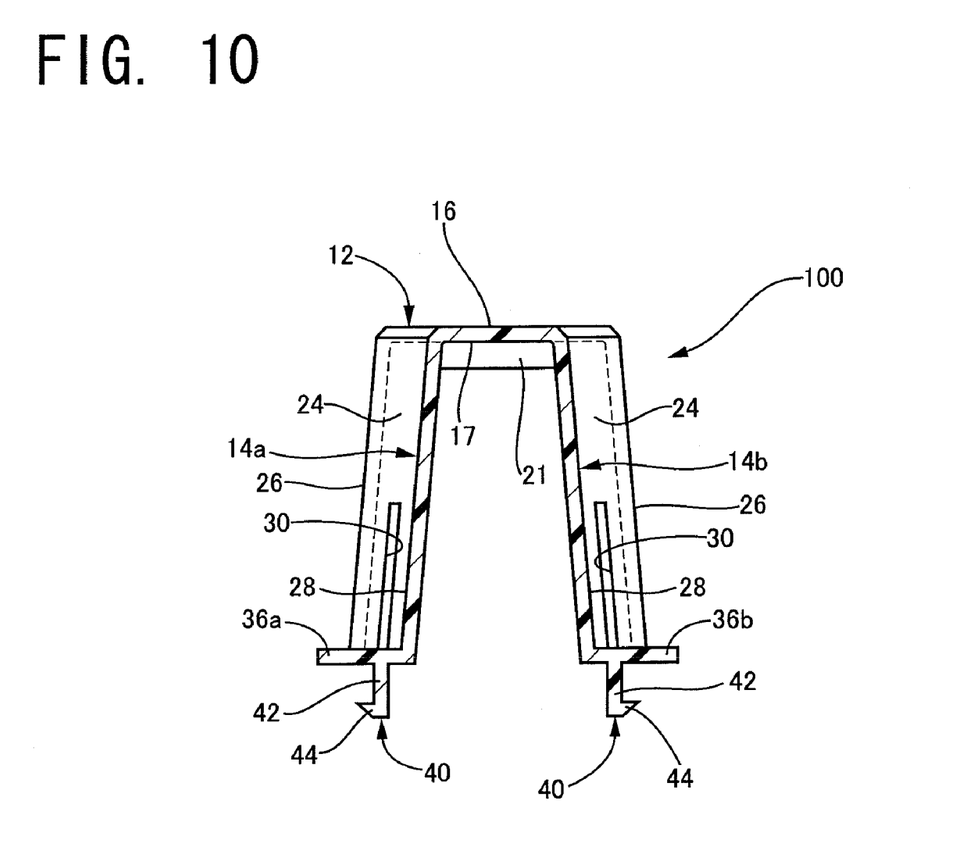
FIG. 10 is a drawing corresponding to FIG. 4 showing another embodiment of the shock absorbing structure for a vehicle according to the present invention.

Next, in order to confirm that the shock absorbing structure having the configuration of the present invention enables a simple tuning of the load deformation characteristic, first of all, there was prepared a shock absorbing structure 100 having the same configuration as the shock absorbing structure 10 shown in FIG. 1 to FIG. 4, except that the length of the slits 30 provided in the corrugated section 24 of each side wall 14 was made about a half of the length of the length of the corrugated sections 24, as shown in FIG. 10, and this was made Test item 2. The shock absorbing structure of this Test item 2 was also manufactured by injection molding using polypropylene. Also, dimensional specifications of each section were the same as those of the above described embodiment.

Then, a collision experiment which was the same as the collision experiment carried out for the shock absorbing structure of the above-described Test item 1 was carried out for the shock absorbing structure of Test item 2 having slits of half the length, using the same method as described above, and the load deformation characteristic of the shock absorbing structure of Test item 2 was examined. The results are shown in FIG. 11.

Meanwhile, the same collision test was separately carried out for a bumper cover using a bumper cover for a front bumper of a general specified vehicle on the market, and the load displacement characteristic of this bumper cover was examined. The results are shown together in FIG. 11.

The load displacement characteristic for the shock absorbing structure of Test item 2 and the load displacement characteristic for the shock absorbing structure of the bumper cover were combined using a known method, to obtain the overall load displacement characteristic for the front bumper having the shock absorbing structure of Test item 2 fitted inside the bumper cover. The results are shown together in FIG. 11.

Figure 11:
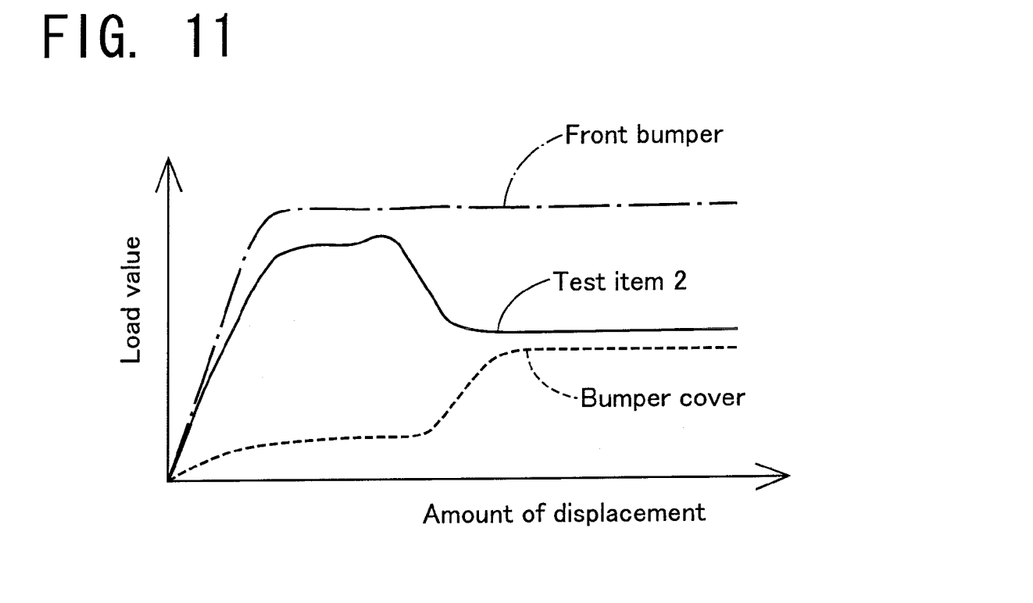
FIG. 11 is a graph respectively showing a load displacement characteristic of the shock absorbing structure for a vehicle shown in FIG. 10, a load displacement characteristic of a simple bumper cover, and a load displacement characteristic of an entire front bumper that is a combination of the shock absorbing structure for a vehicle and the bumper cover.

If the load displacement characteristic of the shock absorbing structure of Test item 2 shown in FIG. 11 and the load displacement characteristic of the shock absorbing structure of Test item 1 shown in FIG. 9 are compared, it is clearly confirmed that with the shock absorbing structure of the present invention the load displacement characteristic is tuned simply by changing the slit length. Also, as will be clear from the respective load displacement characteristic of the shock absorbing structure of Test item 2 shown in FIG. 11, the bumper cover and the front bumper overall, it is confirmed that by tuning the load displacement characteristic of the shock absorbing structure desired shock absorbing characteristics can be easily ensured for the front bumper overall.

Next, the shock absorbing structure of Test item 1 provided with through-holes in the outer flanges as shown in FIG. 1 to FIG. 4 was manufactured and prepared, and a shock absorbing structure having the same configuration as the shock absorbing structure of Test item 1 except for the shape of the through-holes in the outer flanges was manufactured and prepared, and this was made Test item 3. The shock absorbing structures of these Test item 1 and Test item 3 were both made by injection molding using polypropylene, and the dimensional specifications of each section were the same as the dimensions shown in the above-described embodiment.

Then the same collision test as described above was carried out for respective two types of shock absorbing structure (Test item 1 and Test item 3) prepared in this way, and the load displacement characteristic of the shock absorbing structure of Test item 1 and the load displacement characteristic of the shock absorbing structure of Test item 3 were respectively examined. The results are shown in FIG. 12.

Figure 12:
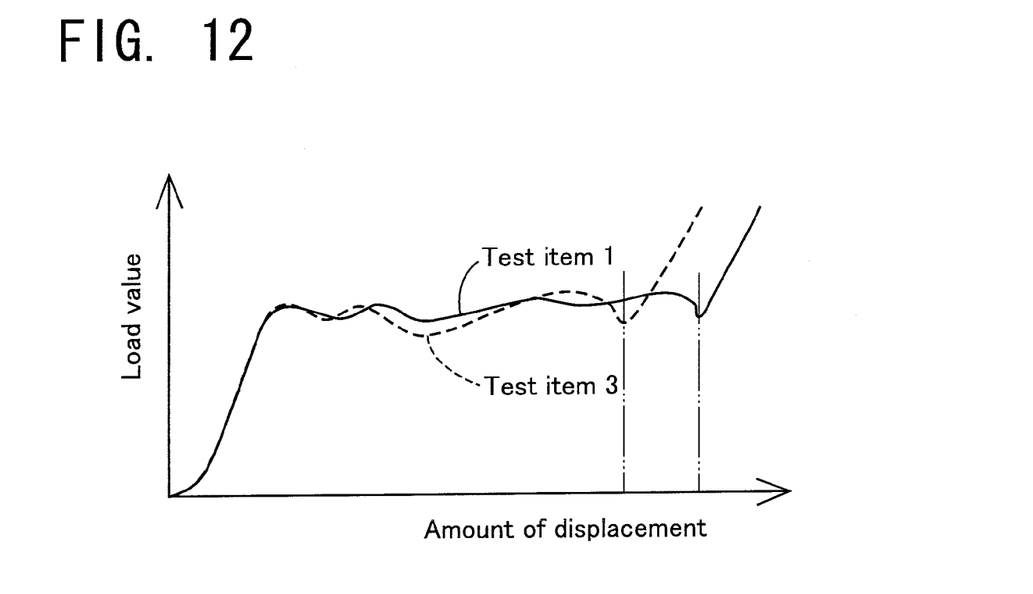
FIG. 12 is a graph respectively showing the load displacement characteristic for a shock absorbing structure for a vehicle having the structure shown in FIG. 1, and the load displacement characteristic for the shock absorbing structure for a vehicle having the same structure as shock absorbing structure for the vehicle shown in FIG. 1, except that the through-holes are not provided in the outer flanges.

As shown in FIG. 12, if the load displacement characteristic of the shock absorbing structure of Test item 1 and the load displacement characteristic of the shock absorbing structure of Test item 2 are compared, it is confirmed that after the load value changes an almost constant value for a while, the value of displacement when the load starts to rise again is larger for Test item 1 than Test item 3. From this fact, it is clearly confirmed that the effective stroke is increased by providing the through-hole in the outer flanges and not connecting the corrugated section and the outer flanges.

Specific structure of the present invention has been described in detail above, but this is merely an illustrative example, and the present invention is not limited in any way by the above disclosure.

For example, although it is possible to have a structure where the width (height) of each side wall 14 becomes gradually narrower (lower) towards one end to the other in a length direction, it is obviously also possible to be a constant size along the entire length.

It is also possible to respectively connect one end sections and associate other end sections, of the two side walls 14a and 14b, in the length direction, by the connecting wall sections 20. Alternatively, it is also possible to omit the connecting wall sections 20 and respectively form reinforcement ribs 21 on inner sides of both ends of the two side walls 14a and 14b in the length direction.

Further, an attachment structure for the shock absorbing structure 10 to the bumper reinforcement 48 is not particularly limited to the shown example.

Still further, an arrangement interval for the plurality of corrugated sections 24 provided on each side wall 14 does not necessarily need to be constant.

Also, the position in the width direction of the corrugated sections 24 where the slits 30 are formed is not limited to the shown example.

In addition, it is also not always necessary for the width of the slits 30 to be constant along their length.

Still further, it is possible to form a plurality of ridge sections on the attachment surface 50 for the bumper reinforcement 48 as an extension member so as to be positioned enclosing outer flanges respectively provided on each of the side walls 14 of the shock absorbing structure 10, and to construct a first opposed section and a second opposed section with sections of outer flange sides of each of these ridge sections. These first opposed sections and second opposed sections are not essential to the present invention, and accordingly can be omitted.

Also, the shape and the size etc. of the top wall 12 can be variously modified according to the section etc. to be arranged on the vehicle.

It is also possible to have one or a combination of three or more of the shock absorbing structures and arrange at the installation sites of a vehicle.

In addition, it is obviously possible to advantageously apply the present invention not only to the shock absorbing structure fitted to the inner side of the front bumper of the vehicle, but also to the shock absorbing structure fitted to a rear side of an external vehicle component in addition to the front bumper or to the rear side of the internal component, or alternatively to any shock absorbing structure fitted to a vehicle that is not a car, such as a train or the like.

Still further, many example will not be given, but the present example can be subjected to various modifications, corrections and improvements by one skilled in the art, and it goes without saying that these types of additional aspects are included in the range of the present invention as long as they do not deviate from the scope of the present invention.

What is claimed is:

1. A shock absorbing structure for a vehicle comprising a resin main body which includes a top wall to which a shock is to be applied and two side walls which are formed integrally with the top wall such that the two side walls respectively extend from opposite two end portions of the top wall so as to be opposed to each other, toward one of opposite sides of the top wall, which side is opposite to the other side thereof on which the shock is applied, said side walls absorb the shock by being deformed, and said resin main body has a U-shaped cross section parallel to a shock-receiving direction in which the shock is to be primarily applied, characterized in that:

each of the side walls forms a substantially square wave shape extending in a direction perpendicular to the shock-receiving direction, with alternating divergent and convergent corrugated sections positioned opposing to each other a specified distance apart in the direction perpendicular to the shock-receiving direction;

an outer flange is integrally formed with the each of the side walls at an end section of the side wall opposite to a top wall side thereof, so as to be extend to an entire length of the side walls in the direction perpendicular to the shock-receiving direction; and a slit extending in the shock-receiving direction is respectively provided on each of the plurality of corrugated sections.

2. The shock absorbing structure for a vehicle according to claim 1, wherein the slit is provided in a central section of the each of the plurality of corrugated sections in a width direction perpendicular to an extending direction of the slit.

3. The shock absorbing structure for a vehicle according to claim 1, wherein a through-hole extending along end sections of the plurality of corrugated sections opposite to the top wall side is provided on the outer flange, so that the outer flange and the plurality of corrugated sections are disconnected.

4. The shock absorbing structure for a vehicle according to claim 1, wherein an engaging section for fixing the outer flange to a specified site of the vehicle is integrally provided on a surface of the outer flange opposite to the top wall side, engaging with an engagement surface provided at the specified site of the vehicle.

5. The shock absorbing structure for a vehicle according to claim 1, wherein the two side walls are respectively inclined such that a distance between the two side walls in the direction in which the two side walls are opposed to each other gradually increases as the side walls are away from the top wall.

6. The shock absorbing structure for a vehicle according to claim 1, further comprising an integral reinforcement rib extending continuously along an inner surface of an inner circumferential surface of at least one end section of the shock absorbing structure in the direction perpendicular to the shock-receiving direction, wherein the inner circumferential surface is defined by inner surfaces of the two side walls and a rear surface of the top wall.

7. The shock absorbing structure for a vehicle according to claim 1, wherein each pair of the plurality of corrugated sections positioned opposing to each other are respectively inclined away from each other as the pair of the plurality of corrugated sections extend from the top wall toward the outer flange.

8. The shock absorbing structure for a vehicle according to claim 1, wherein each alternating pair of the plurality of corrugated sections positioned opposing to each other are respectively inclined toward each other as the pair of the plurality of corrugated sections extend from the top wall toward the outer flange.

9. The shock absorbing structure for a vehicle according to claim 1, wherein each of the pair of the plurality of corrugated sections positioned opposing to each other are respectively inclined away from each other outwardly in directions in which the two side walls are opposed to each other, so as to define a trapezoid wave shape in plan view extending in the direction perpendicular to the shock-receiving direction.

10. The shock absorbing structure for a vehicle according to claim 1, wherein each of the pair of the plurality of corrugated sections positioned opposing to each other are respectively inclined toward each other inwardly in directions in which the two side walls are opposed to each other, so as to define a trapezoid wave shape in plan view extending in the direction perpendicular to the shock-receiving direction.

11. A shock absorbing structure and structure for attaching the shock absorbing structure to a vehicle, comprising:

a shock absorbing structure comprising a resin main body which includes a top wall to which a shock is to be applied and two side walls which are formed integrally with the top wall such that the two side walls respectively extend from opposite two end portions of the top wall so as to be opposed to each other, toward one of opposite sides of the top wall, which side is opposite to the other side thereof on which the shock is applied, said side walls absorb the shock by being deformed, and said resin main body has a U-shaped cross section parallel to a shock-receiving direction in which the shock is to be primarily applied, characterized in that:

each of the side walls forms a substantially square wave shape extending in a direction perpendicular to the shock-receiving direction, with alternating divergent and convergent corrugated sections positioned opposing to each other a specified distance apart in the direction perpendicular to the shock-receiving direction;

an outer flange is integrally formed with the each of the side walls at an end section of the side wall opposite to a top wall side thereof so as to be extend to an entire length of the side walls in the direction perpendicular to the shock-receiving direction; and a slit extending in the shock-receiving direction is respectively provided on each of the plurality of corrugated sections;

the structure for attaching the shock absorbing structure comprising:

an extension member extending in the direction perpendicular to the shock-receiving direction; and a first opposed section and a second opposed section provided on the extension member, the first opposed section and the second opposed section opposing to each other at a predetermined distance apart in a direction perpendicular to both the extending direction of the extension member and the shock-receiving direction;

wherein the outer flanges formed with the two side walls of the shock absorbing structure are fixed to a position between the first opposed section and the second opposed section on the extension member to attach the shock absorbing structure to a vehicle via the extension member, and wherein the outer flanges contact the first opposed section and the second opposed section, respectively, to prevent outward displacement of the pair of outer flanges when the opposing side walls of the shock absorbing structure are deformed by a shock.

12. The shock absorbing structure for a vehicle according to claim 1, wherein the substantially square wave shape formed by each of the side walls is continuous between opposing ends of the shock absorbing structure.

* * * * *